Patented Aug. 3, 1937

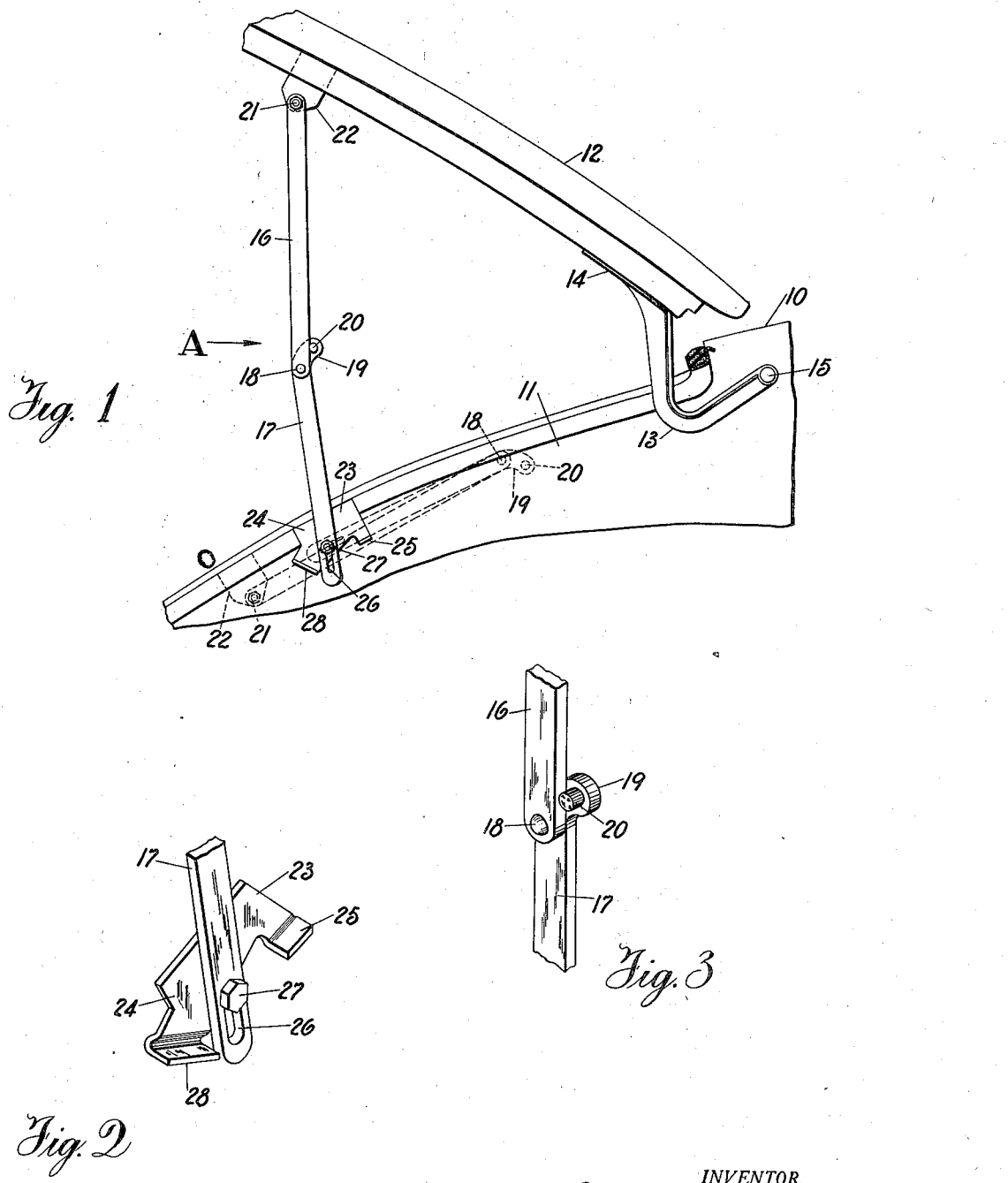

2,088,888

UNITED STATES PATENT OFFICE 2,088,888

VEHICLE DECK SUPPORT

Edward F. Wagner, South Bend, Ind., assignor to The Studebaker Corporation, South Bend, Ind., a corporation of Delaware Application December 11, 1935, Serial No. 53,981

5 Claims. (Cl. 217—60)

This invention relates to hinges and particularly to hinge structures for supporting the rear decks of automobiles and lids of receptacles in general in open position.

One of the primary objects of my invention is to provide a hinge structure which is automatically locked against folding when supporting the deck or lid in open position.

Another object is to provide a hinge or prop structure comprising a pair of links pivotally connected by brackets to an automobile body and rear deck respectively in a manner so that the deck will not accidentally drop into closed position.

Another object is to provide a hinge or prop structure comprising a pair of links pivotally connected at their adjacent ends and pivotally connected at their opposite ends to brackets secured respectively to an automobile body and rear deck, one of the links having a stop formed thereon and one of the brackets having a stop thereon operative to prevent accidental closing of the deck.

A still further object is to provide a hinge support including a pair of links which are normally folded but which are unfolded to substantial alignment when the deck or lid is open and remain in substantial aligned position when the deck or lid is slightly lowered and which cannot be folded until the deck is raised slightly and the links are manually folded a small amount.

Other objects, and objects relating to details of construction and methods of manufacture and operation will be apparent from the drawing and the detailed description to follow.

In the drawing in which like numerals refer to like parts throughout the several views:

Fig. 1 is a fragmentary sectional view of an automobile body with a rear deck in open position supported by the hinge structure comprising my invention, the hinge links being also shown in dotted lines in folded position:

Fig. 2 is a perspective view of the body bracket and the link supported thereby:

Fig. 3 is a perspective view of the links at their adjacent pivoted ends.

In the drawing, I have shown a vehicle body 10 of the roadster or coupé type having an opening 11 therein adapted to be closed by a rear deck or lid 12. A hinge 13 having a flat face 14 is rigidly secured adjacent to the forward edge of the deck 12, the hinge being substantially U-shaped and pivotally connected at 15 to the body 10 to thus form a support for the deck so that the same can be conveniently opened and closed. The foregoing construction may be of any conventional design and forms no part of my invention except as the same is included therewith so that a further description of these automobile parts is not deemed necessary.

The hinge support comprises a pair of links 16 and 17 pivotally connected at their adjacent ends at 18 as shown in Figs. 1 and 3. The link 17 has a curved end 19 in which is mounted a stud or stop 20 adapted to engage with the edge face of the link 16 for a purpose to be hereinafter described. The link 16 is pivotally connected at 21 to a bracket 22 which may be welded or secured in any suitable manner to the deck 12. A bracket indicated generally by the numeral 23 has a body portion 24 secured to the automobile body 10 by welding or in any suitable manner so that the bracket forms an integral part thereof. A stop or support 25 extends substantially at right angles to the body portion 24 of the bracket 23 to provide a support for the link 17 when the deck 12 is in closed position as is clearly shown in dotted lines in Fig. 1. The link 17 is provided with a slot 26 adjacent to the end thereof opposite the pivot 18 in which is received a pin or stud 27 secured in the bracket 24 to provide a connection between link 17 and the body 10. The bracket 23 is provided with a second stop 28 at its end opposite the stop 25 against which the lower end of the link 17 abuts when the links are unfolded to substantial alignment with the deck or lid in open position as is shown in Figs. 1 and 2.

When the deck 12 is in open position accidental closing of the same is prevented because of the engagement of the link 17 against the stop 28 and the engagement of the pin 20 on the link 17 against the edge face of the link 16 opposite to the edge face of the link 17. To lower the deck to closed position it is necessary to first raise the same slightly at which time the link 17 will be moved to a position out of engagement with the stop 28, this movement being permitted because of the slot 26 therein after which the links 16 and 17 may be forced manually in the direction of the arrow A so that the pivot 18 will move past the dead centers of the pins 21 and 27 when the deck 12 will automatically lower to its closed position. It will be observed from Fig. 1 that the links 16 and 17 are prevented from folding in a direction opposite to the arrow A because of the pin 20 on the link 17 which engages against the link 16.

From the foregoing description it will be seen that I have provided a hinge or prop structure which is operative to prevent accidental closing of the deck or lid and it will also be apparent to those skilled in the art that various changes can be made in the structure shown and described without departing from the spirit and substance of my invention, the scope of which is to be measured only by the sub-joined claims.

What I claim is:

1. A lid support comprising, a pair of pivotally connected links operatively connected with a receptacle and lid therefor, a stop on the receptacle engageable with one of said links adjacent to the end thereof, a stop on said one link engageable with the other link on the side thereof opposite to said first stop, and a slot in said one link to permit raising said lid slightly thereby moving said one link out of engagement with said first stop to permit folding of said links and thereby permit closing of said lid.

2. A vehicle body rear deck support comprising, a pair of links pivotally connected at their adjacent ends, one of said links being pivotally connected with the deck, and the other link having a slot therein, a bracket attached to the vehicle body having a pin thereon extending through said slot in said other link, a pin on said other link engageable with said one link, and a stop on said bracket engageable with said other link on the side opposite to said link pin thereon, said slot being so located in said link and of such size as to permit movement of the said link out of engagement with said stop thereby permitting folding of said links and closing of said deck.

3. A vehicle body rear deck support comprising, a link pivotally connected with the deck, a second link having a slot therein pivotally connected with said first link at the end thereof opposite to its connection with said deck, a bracket attached to the vehicle body, a pin on said bracket extending through the slot in said second link, a pin on said second link engageable with said first link adjacent to the pivotal connection of said links, and a stop on said bracket engageable with said second link adjacent to the slotted end thereof on the side thereof opposite to the pin on said second link, said slot being so located in said link and of such size as to permit movement of said link out of engagement with said stop to permit folding of said links and closing of said deck.

4. A lid support comprising, a pair of links pivotally connected at their adjacent ends and hinged at their opposite ends to the lid and a receptacle, one of said links having a slot therein, a fixed pin on the receptacle extending through said slot, a fixed stop on the receptacle engageable with an edge face of said slotted link when said lid is in open position, and a stop on said slotted link engageable with the edge face of the other link at the side thereof opposite the engagement of said first stop with said slotted link when said lid is in open position thereby precluding accidental closing of the lid, said slot being so located in said link and of such size as to permit movement of the said link out of engagement with said first stop to thereby permit folding of said links and closing of the lid.

5. A lid support comprising, a pair of links pivotally connected at their adjacent ends and hinged at their opposite ends to the lid and a receptacle, one of said links having a slot therein, a fixed pin on the receptacle extending through said slot, a stop on the receptacle engageable with said slotted link to limit movement thereof in one direction, a stop on said slotted link engageable with the other link to limit movement thereof in the same direction as said slotted link thereby precluding accidental closing of the lid, said slot being so located in said link and of such size as to permit movement of the said link out of engagement with said first stop to thereby permit folding of said links and closing of the lid.

EDWARD F. WAGNER.